United States Patent [19]

Gould et al.

[11] Patent Number: 5,402,896

[45] Date of Patent: Apr. 4, 1995

[54] DISKETTE STORAGE FILE

[75] Inventors: David S. Gould, Duluth; Stephen P. Chininis, Norcross, both of Ga.

[73] Assignee: Gould Plastics, Inc., Lawrenceville, Ga.

[21] Appl. No.: 157,611

[22] Filed: Nov. 24, 1993

[51] Int. Cl.[6] ............................................. A47F 7/00
[52] U.S. Cl. ...................................... 211/41; 206/309; 211/40
[58] Field of Search ............... 211/40, 41, 46, 162, 211/113, 55, 11; 206/309, 387; 312/184, 183; 40/374, 159.2

[56] References Cited

U.S. PATENT DOCUMENTS

| | | | |
|---|---|---|---|
| 2,968,882 | 1/1961 | Ozeki | 40/374 |
| 3,388,662 | 6/1968 | Ravreby | 211/39 X |
| 3,958,348 | 5/1976 | Sakamoto | 40/374 |
| 4,185,406 | 1/1980 | Schotsman | 40/159.2 X |
| 4,193,218 | 3/1980 | Mermelstein | 312/184 X |
| 4,776,623 | 10/1988 | Manning | 206/387 X |
| 5,201,414 | 4/1993 | Kaszubinski | 206/309 |
| 5,232,089 | 8/1993 | Kim | 206/309 |

Primary Examiner—Robert W. Gibson, Jr.
Attorney, Agent, or Firm—Jones & Askew

[57] ABSTRACT

A computer diskette storage file for organization and storage of diskettes. The storage file can be hung in a filing drawer for storage and access at the work station. The diskette storage file comprises a storage plate wherein the diskettes are held in place such that the identification label of the diskette is readable, and the diskette easily retrievable. The diskette storage file includes hangers for supporting the storage file within a filing drawer.

1 Claim, 3 Drawing Sheets

DISKETTE STORAGE FILE

FIELD OF THE INVENTION

This invention relates generally to computer diskette organizing and storage devices. More specifically, the invention relates to a computer diskette organization and storage file which is of the size and structure to be placed and used within a filing drawer or cabinet.

BACKGROUND OF THE INVENTION

At present, data processing systems or computers are used in nearly every phase of business organizations. A large part of the data and programming materials for such computers are stored on separate diskettes, generally referred to as "floppy" disks. One popular configuration for the floppy disk is the 3½ inch floppy disk which is encased in a hard, protective casing. The casing provides a rigid, manageable protective shell for the disk and allows for storage and handling of the disk without undue risk of damage to the disk itself. These floppy disks have a retractable panel that allows access to the recording media when the disk is inserted in a disk drive.

As the number of diskettes necessary for everyday access to information increases, so does the need for an accessible yet space efficient system for storing these diskettes. Typically, the diskettes are stored in a stacked manner in boxes which are slightly wider than the diskettes. The diskettes may be difficult to remove from the box because tight packaging does not allow fingers to enter on both sides of the diskette to pull the diskettes out.

Generally, the data stored on the floppy disk is identified by means of an adhesively-attached paper label placed over the end of the diskette opposite the end having the retractable panel. It is difficult to read the information on the label when the diskettes are stored in a box. Diskettes are typically stored in a box or Rolodex-type container and the box or container is placed on the desktop for easy and frequent access. The box or container is often bulky and not space-efficient, and clutters the desktop or workspace. Diskettes also are often stored in boxes for archival storage. The boxes may then be placed in a filing drawer or in a large storage box. If one of these diskettes is needed, it is usually difficult and time consuming to locate the diskette.

There thus is a need for a diskette storage device which provides easy access to the individual diskettes, allows the labels of the diskettes to be easily read for quick location and retrieval of the desired diskette, and is space-efficient. There is also a need for a long-term or archival storage system that provides quick and easy location and retrieval of a desired diskette that is space-efficient and adaptable to a normal work station.

SUMMARY OF THE INVENTION

The present invention is directed to a diskette storage system which is space efficient and provides ease of locating and retrieving the desired diskette. The diskette storage file of the present invention is of the size and shape such that it fits in a filing drawer or cabinet for storage. The diskette storage files will hold a number of diskettes in such a position that the identification label of each diskette is readable and the diskettes are easily removed from the file for use.

Stated somewhat generally, the present invention comprises a diskette storage file that holds a number of diskettes and fits in a filing cabinet or drawer. The diskette storage file of the present invention holds a number of diskettes in several columns. The diskettes are held in place within the storage file by placing a diskette on one of a series of equally spaced horizontal ledges located on the wall of the storage file. Each ledge has a ledge face and several pairs of brackets which are spaced diskette-width apart and face inward toward each other to form a slot slightly wider than that of a diskette. The brackets protrude outward from the wall of the storage file an amount slightly greater than the width of a diskette. The diskette is placed on the ledge between two facing brackets and is held in place on the ledge in the slot formed between the ledge face and the brackets.

Each of the ledges of the diskette storage file may contain several pairs of facing ledges, so that several diskettes may be held in place next to each other on the same ledge. There are a number of ledges equally spaced from each other and horizontal in relation to the wall of the diskette storage file. The ledges are vertically spaced so that when diskettes are placed in the diskette storage file, the information label of each diskette is readable. The bracket pairs on each ledge are aligned with the bracket pairs of the other ledges so that when the diskette storage file is filled with diskettes the diskettes are in columns.

The diskette storage file may be of the size and shape to fit a file storage system designed for 8½×11 papers or 8½×14, also known as legal-size materials. The diskette storage file has hangers such as a notch, an extension, or an L-shaped or semi-circular protrusion on each side of the storage file such that the diskette storage file fits into a file storage system by placing the hangers of the diskette storage file over the bars or slots of the filing drawer or cabinet. The number of diskettes the diskette storage file will hold depends on the size of the filing system the storage file is designed to fit. Typically, a diskette storage file designed to be used in an 8½×11 filing system will have eight ledges (rows) and each ledge will have three pairs of brackets. Thus, three diskettes will fit on each ledge and with eight ledges, the diskette storage file will hold a total of 24 diskettes.

Accordingly, it is an object of the invention to provide a diskette storage file which is space efficient and allows for easy identification and accessibility for a desired diskette.

It is another object of the present invention to provide a diskette storage file which is of the size and structure to fit in a filing drawer or cabinet.

It is a further object of the present invention to provide a single molded filable diskette storage file of sturdy plastic.

It is yet another object of the present invention to provide an inexpensive diskette storage file which can be stored and accessed within a filing drawer or cabinet.

Other objects, features and advantages of the present invention will become apparent upon reading the following specification, when taken in conjunction with the drawings and the claims.

DETAILED DESCRIPTION OF THE PREFERRED EMBODIMENT

Figure 1:
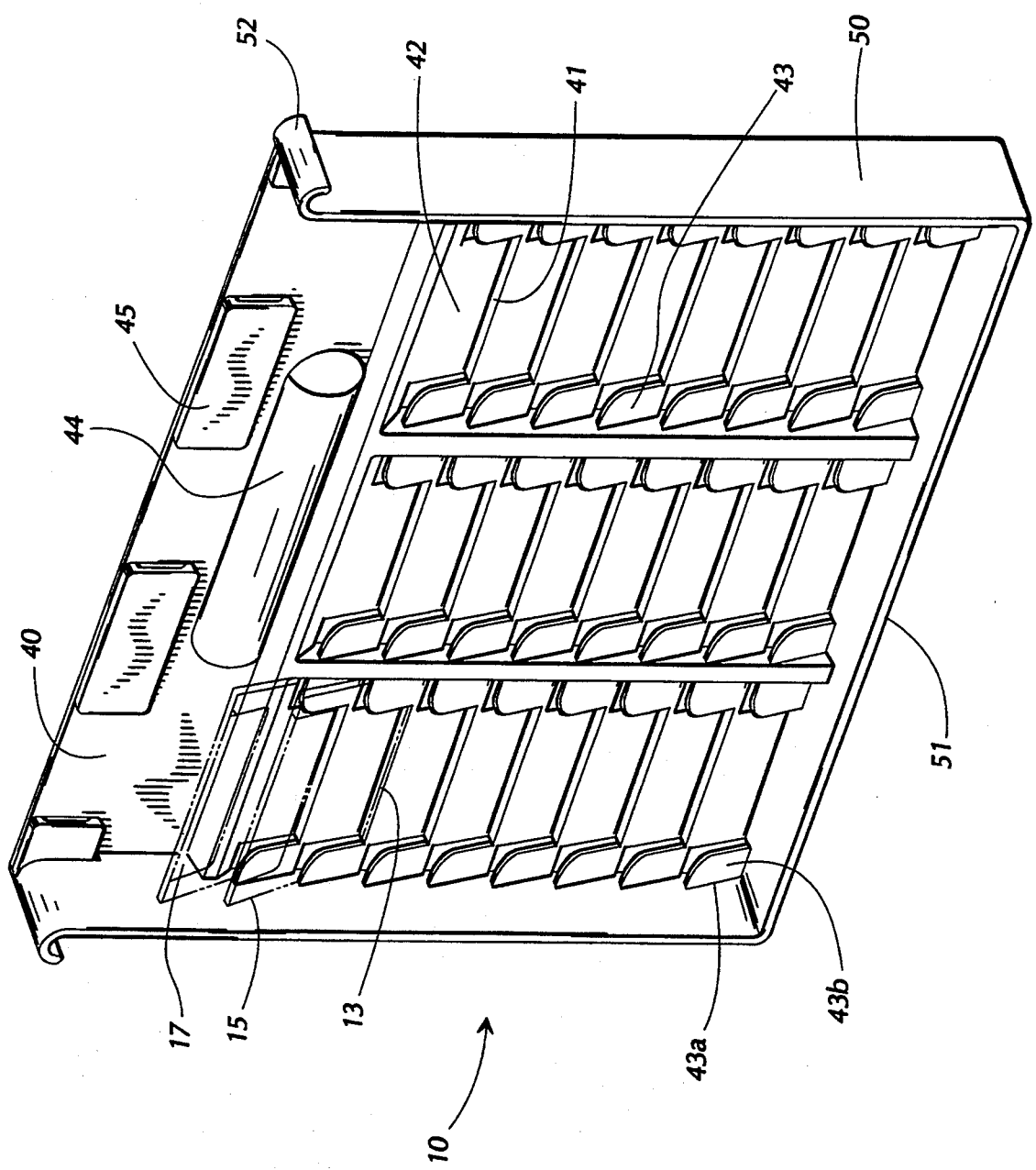
FIG. 1 is a front side pictorial view of the diskette storage file according to the preferred embodiment of the present invention.
Figure 2:
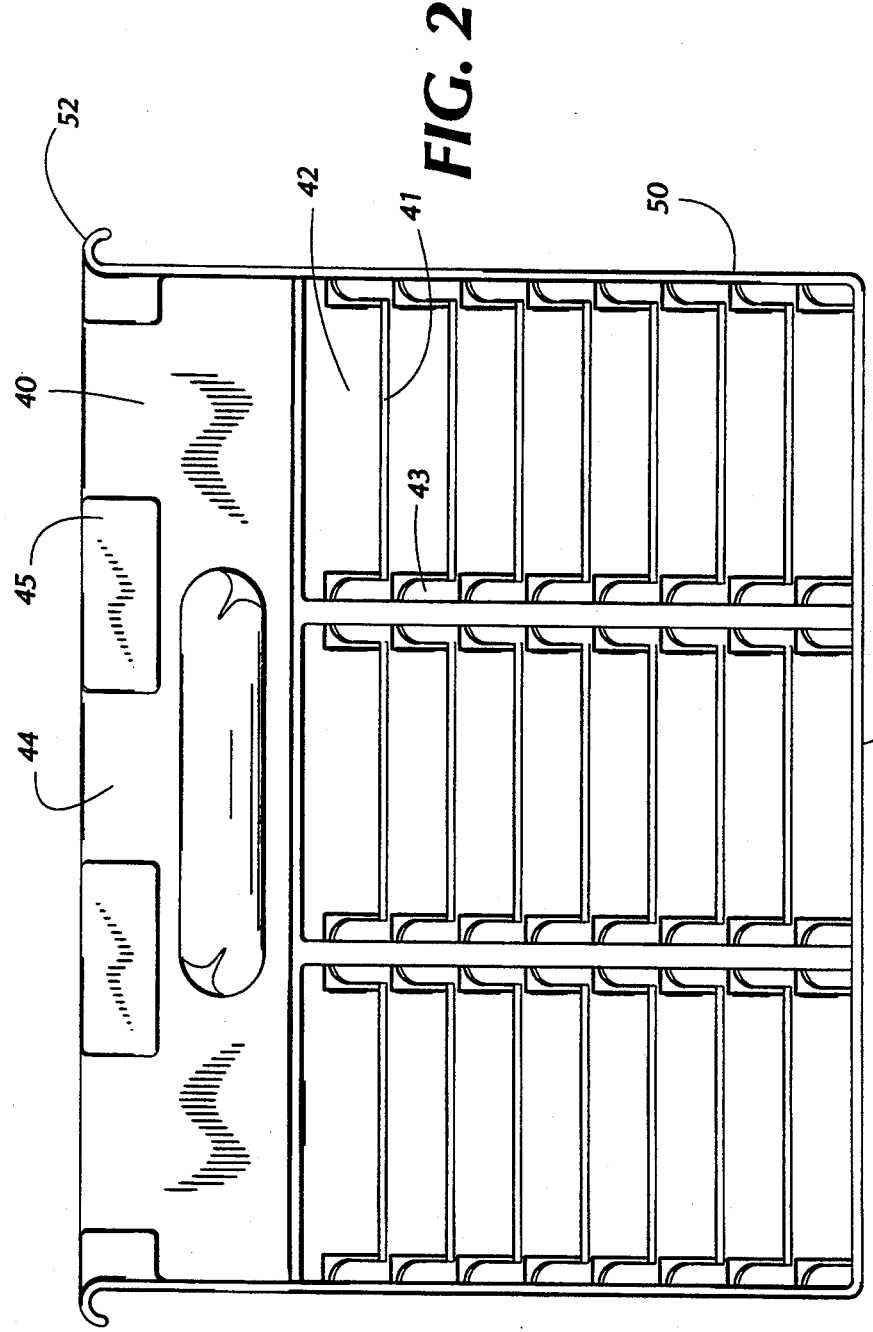
FIG. 2 is a front elevation view of the diskette storage file shown in FIG. 1.
Figure 4:
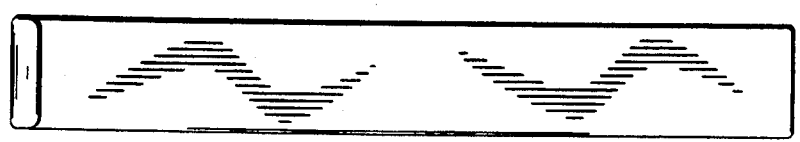
FIG. 4 is a side elevation view of the diskette storage file shown in FIG. 1.
Figure 3:
FIG. 3 is a top plan view of the diskette storage file shown in FIG. 1.
Figure 6:
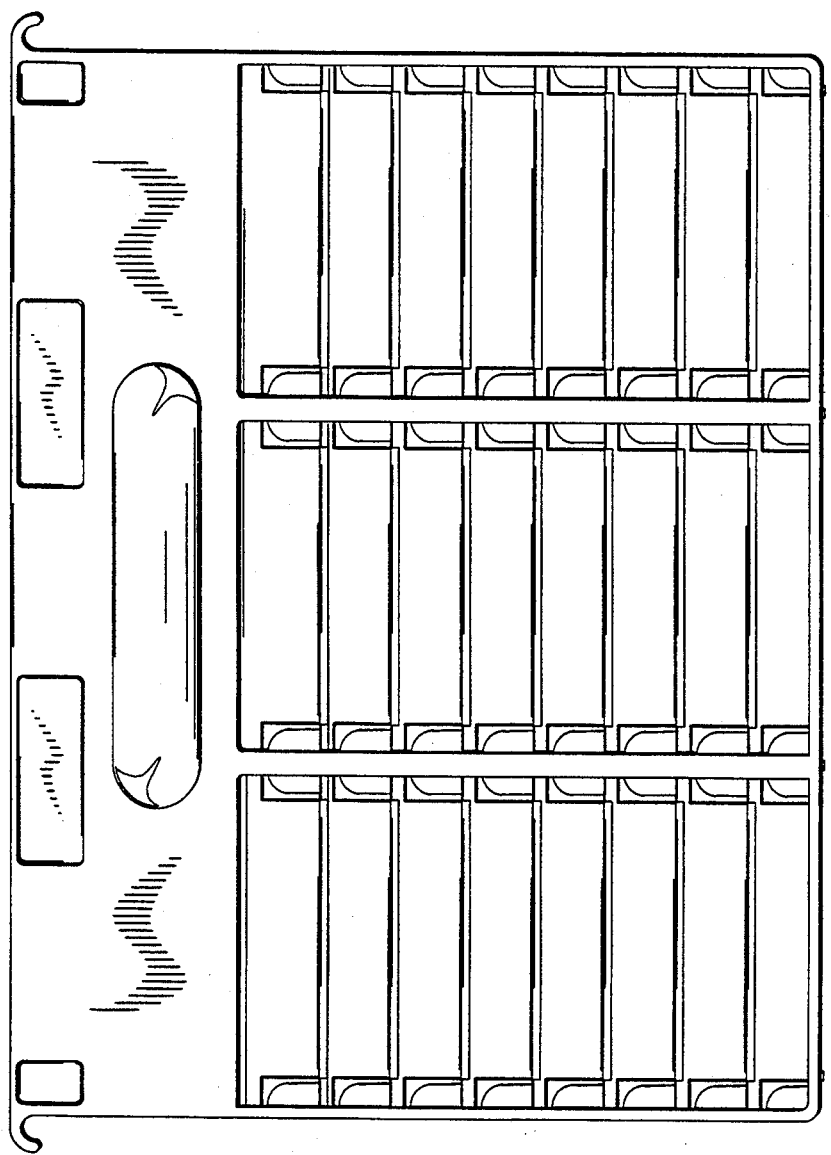
FIG. 6 is a back elevation view of the diskette storage file shown in FIG. 1.
Figure 5:
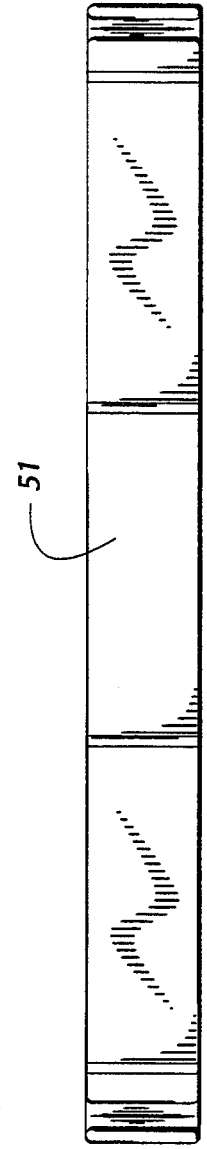
FIG. 5 is a bottom plan view of the diskette storage file shown in FIG. 1.

Referring now in detail to the drawings, in which like numerals refer to like parts throughout the several views, FIG. 1 illustrates the diskette storage file 10 in accordance with the present invention.

The diskette storage file 10 has a wall 40 in which is formed a series of horizontal ledges 41 protruding from the front of the wall 40. The width of each ledge 41 is sufficient to support the lower edge 13 of a diskette 15 placed on the ledge 41. The ledges 41 are parallel with each other, and preferably are vertically spaced equidistant from the next adjacent ledge along the length of the wall 40.

The surface on the wall 40 between each two vertically-spaced adjacent ledges 41 forms the ledge faces 42. Along each ledge face 42 are several pairs of two brackets 43 spaced slightly more than diskette-width apart from each other. In the preferred embodiment, as best seen in FIG. 1, there are three columns of ledges 41, ledge faces 42 and brackets 43. The brackets 43 have a portion 43a which projects perpendicular to the wall 40 and a portion 43b which is parallel to the wall 40. The portion 43a of bracket 43 is of a slightly longer length than the thickness of a single diskette. The portion 43b of bracket 43 projects parallel to and toward the corresponding bracket within the pair such that a diskette 15 will fit and be held in place by resting on ledge 41 between the ledge face 42 and bracket 43. The horizontal ledges 41 are equally spaced apart such that when diskettes are placed on the ledges 41 and held in place between the brackets 43 and the ledge faces 42, the identification label 17 of each diskette within the storage file 10 is readable. The brackets 43 preferably are molded with the wall 40 of the storage file 10 in a manner known to those skilled in the art.

Adjoining the wall 40 of the diskette storage file 10 are two sidewalls 50 and a bottom wall 51. Each of the walls 50 and 51 project perpendicular to wall 40 and project outward from wall 40 a distance sufficient to exceed the outwardmost projecting diskette when the diskette storage file 10 is filled to capacity. At the top end of both of the sidewalls 50, as shown in FIG. 1, are hangers 52. The hangers 52 are formed by rounding the end of each sidewall 50 into an arc that will fit over the bars or slots of a filing system. The walls 50 and 51 preferably are molded with the wall 40 of the storage file 10 in a manner known to those skilled in the art. Likewise, the hangers 52 preferably are molded with the sidewalls 50 in a manner known to those skilled in the art.

The wall 40 of diskette storage file 10 also includes a handle 44. The handle 44 is formed as a protrusion near the upper end of wall 40 such that an arc is formed within the wall to provide for grasping the diskette storage file. The arc of handle 44 projects outward from the wall 40 in the same direction as the sidewalls 50 and the bottom wall 51, such that the diskette storage file is grasped by placing fingers in the arc of the handle 44 from behind wall 40 and the thumb over the top of wall 40.

Wall 40 further contains label holders 45 formed as flat surfaces parallel to the wall 40 protruding in front of that wall, and having slots in each end for receiving a file label. The label holders 45 are spatially positioned along the top edge of wall 40 such that they can receive file labels and the file labels will project upward from and past the wall 40 to be read in a typical fashion.

In using the diskette storage file 10, a diskette 15 is placed on one of the ledges 41 and held in place between the corresponding ledge face 42 and the pair of brackets 43. A diskette may be placed on each of the ledges 41 between each pair of brackets 43 until the storage file 10 is full. The diskettes 15, when held in place on each of the ledges 41, are positioned within the diskette storage file 10 such that the identification label 17 of each diskette is readable. Each diskette may be easily located, and then grasped and removed from the file 10.

The diskette storage file 10 is placed in a filing drawer by positioning the hangers 52 over the bars or slots of the filing drawer. The storage file 10 may then be moved within the filing drawer by sliding it in a fashion typical of hanging files or file folders. A file label may be placed in the label holders 45 so that the storage file can be easily located within the filing drawer.

It should be understood that the preferred embodiment has been disclosed by way of example, and that other modifications may occur to those skilled in the art without departing from the scope and spirit of the claims.

What is claimed is:

1. A storage case for diskettes, comprising:
   a storage plate having a series of ledges for supporting the lower edge of a diskette placed on said ledge, and sidewalls and a bottom wall;
   each ledge having a ledge face, and at least one bracket located adjacent said ledge face and positioned in front of the ledge face to support a side of the diskette placed on said ledge;
   each wall projecting perpendicular from said plate and being of a substantial width sufficient to protrude further than the diskette placed within said plate; and
   hanging means for supporting said storage plate along the bars of a filing drawer wherein the means for hanging said plate in a filing system is an arc formed by rounding the top of said sidewalls.

* * * * *